United States Patent Office 3,343,620
Patented Sept. 26, 1967

3,343,620
SELF-COMPENSATING TRANSMISSION FOR DRIV-
ING AND/OR BRAKING THE WHEELS OF A VE-
HICLE
Alexander Nicolas Karavias, 21a Aristotelous St.,
Athens 103, Greece
Filed June 7, 1966, Ser. No. 555,867
Claims priority, application Greece, July 12, 1962,
25,691
6 Claims. (Cl. 180—23)

This application is a continuation-in-part of application Ser. No. 291,147, filed June 27 1963, and since abandoned.

This invention relates to self-compensating transmissions for driving and/or braking of a vehicle.

It is a major object of the present invention to provide a system of self-compensating transmission for driving and/or braking of a vehicle, which system can act from a main or drive shaft upon all the wheels of the vehicle and which system can compensate for a difference in the friction which the ground provides for a given wheel of the vehicle relative to the friction which the ground provides for at least one other wheel of the vehicle.

The means of the prior art by which a vehicle such as an automobile is set in motion and is braked has essential defects. Thus, for example, known systems in which the driving power of an automobile is transmitted only to two wheels through only one differential are not satisfactory because the propulsion of the automobile on the ground is actuated through these two wheels only and, therefore, no compensation is provided for frictional differences between the ground and the other two wheels. In order to eliminate this shortcoming, in certain other systems of the prior art use is made of a second differential for the other pair of wheels, but such systems also have a shortcoming in that in reality an effective coupling takes place between the wheels through the ground. Consequently, in these last mentioned systems there is an unequal angular speed among the wheels due to the fact that it is practically impossible for the real radii of each of the four wheels to be exactly equal to each other even if the four wheels themselves have apparently the same diameter, because compression and deformation of the tire of each wheel are always different from that of the tires of the other wheels since the weight of the vehicle is not exactly equally distributed to the wheels and, further, since the air compression of each tire as well as the ground configuration under each tire are different.

Braking according to the prior art generally is applied through a brake on each wheel and has the shortcoming that each of the four wheels does not react equally relative to the motion of the vehicle for the following reasons.

In the first place, the effect of each brake depends only on the friction between the elements of the brake, such as between the brake shoe and the brake drum, and, accordingly, the brakes do not exert any control on the basic relation of the friction between each of the wheels and the ground. This latter relation continuously varies at every moment, because it depends upon friction between the wheels and the ground. This friction is in most cases unequal between one wheel and the others and, for this reason, on every application of the brake the automobile tends to veer from its proper direction (i.e. it side skids).

Furthermore, the center of gravity of the automobile is at a point higher than the level of the ground, so that the speed of the automobile produces through its mass, due to inertia, a force dynamically increasing the weight of the automobile on the front wheels and reducing at the same time the weight of the automobile on the rear wheels; consequently, when a certain speed is exceeded and the brakes applied abruptly the vehicle will inevitably tend to overturn.

The above mentioned shortcomings are eliminated by the present invention because, through the invention all the wheels of a vehicle are automatically equally driven or braked by the driving or braking means, respectively, of the vehicle and, thus, the vehicle neither side skids nor overturns no matter how abruptly one may apply the brakes and under no mater what conditions, and no matter how high the speed may be, and no matter how the friction may vary between the ground and the various wheels. According to the invention, the friction between the ground and the wheels controls at every moment and automatically, the degree of braking and/or driving for each wheel through a mutually reactive balanced compensation system cooperating with all the wheels of the vehicle. This compensation takes place for each one of the wheels in relation, on the one hand, to the degree of friction between the ground and the wheel, and, on the other hand, in relation to the effective weight on the wheel.

The systems of the invention are composed of two parallel systems including together a number of differentials corresponding to the number of the wheels and balance means interconnecting the parallel systems.

The invention will now be further described by reference to the drawings, in which.

Figure 1:
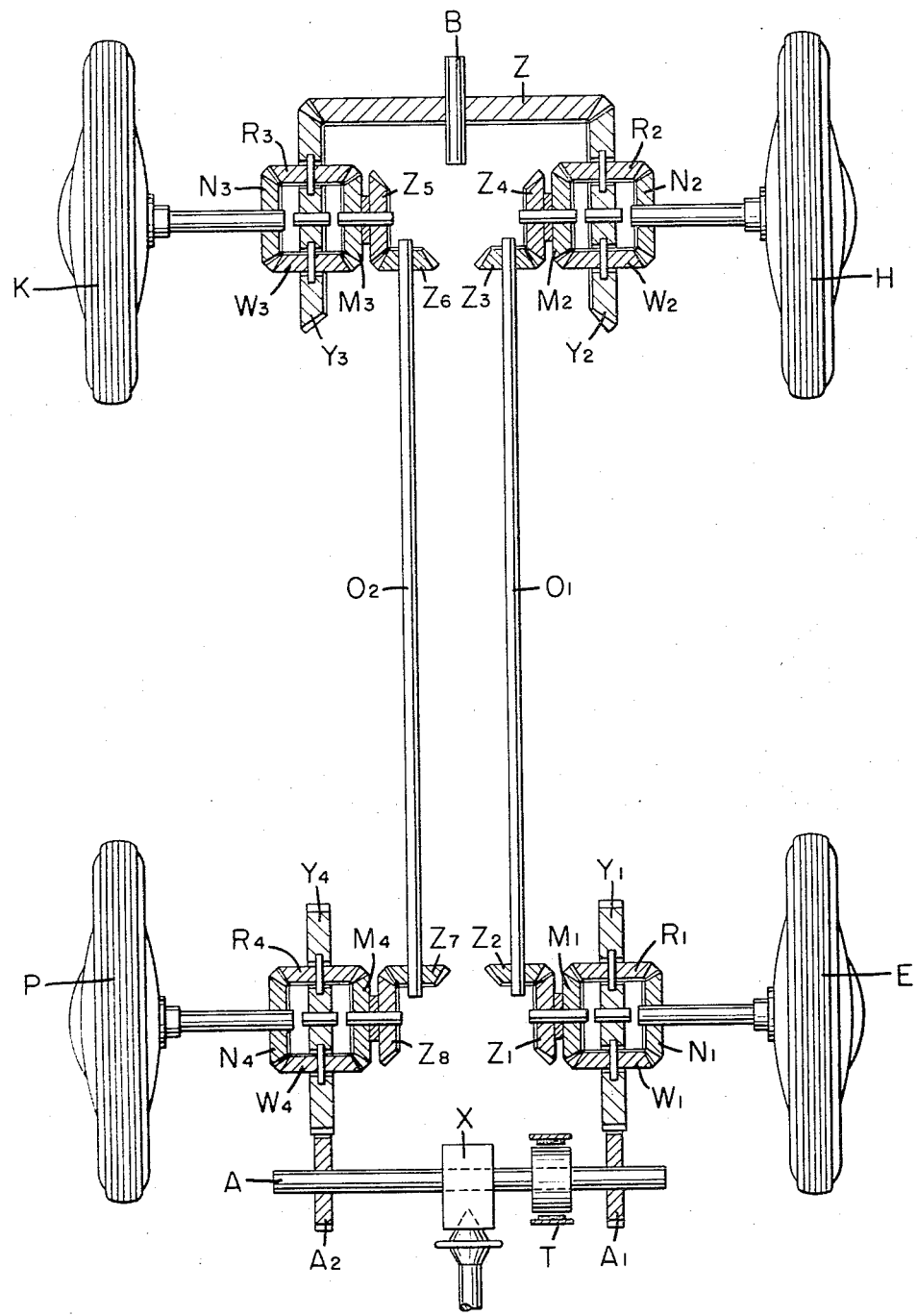
FIG. 1 is a plan view, partly in section, of a system according to the invention for a four-wheeled vehicle.

Through a main shaft A both driving and braking is effected (FIGS. 1–5). The shaft A is operatively connected to the engine or other power source of the vehicle by means of a gear box X. The main shaft A carries two gears A1 and A2, as well as the revolving part of any type of a brake T. The brake T is controlled by conventional means such as a foot pedal or hand lever (not shown).

The systems also include a shaft B mounting a gear Z and forming therewith a rotary balance for providing mutual balancing and compensation between two parallel systems, which parallel systems are hereinafter described.

The transmission of motion and braking to the wheels, at least a pair of which or an unpaired one of which is directionally guided by a rudder or steering means (not shown), is effected, according to conventional practice, through universal joints, which, for the sake of simplicity, are not illustrated in the drawings.

Each differential of the systems of the invention may be of the conventional type in which the following are considered as its three parts: (1) one planetary gear, (2) the other planetary gear and (3) the crown with its pinions (satellites).

Figure 2:
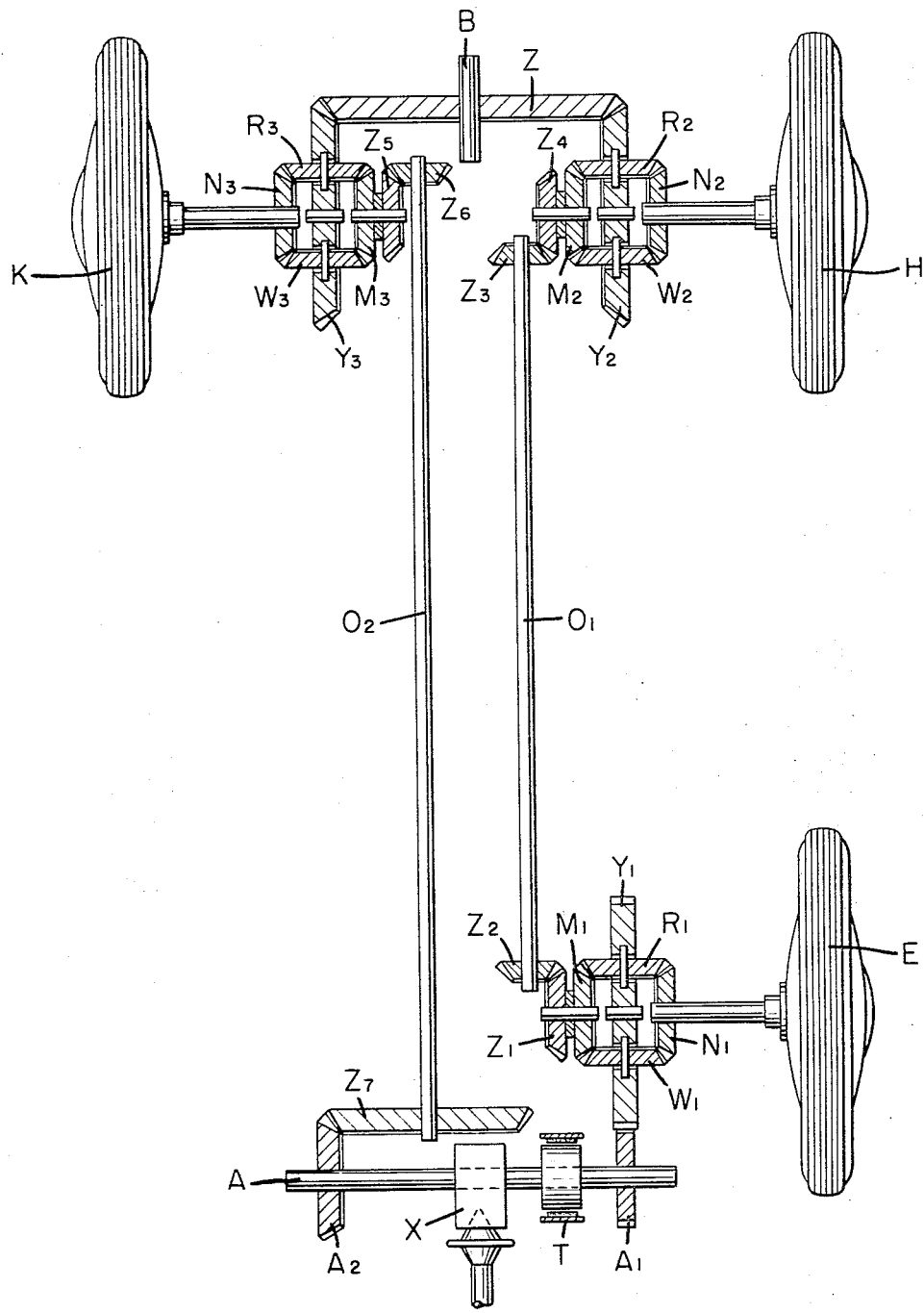
FIG. 2 is a plan view, partly in section, of a system according to the invention for a three-wheeled vehicle.
Figure 3:
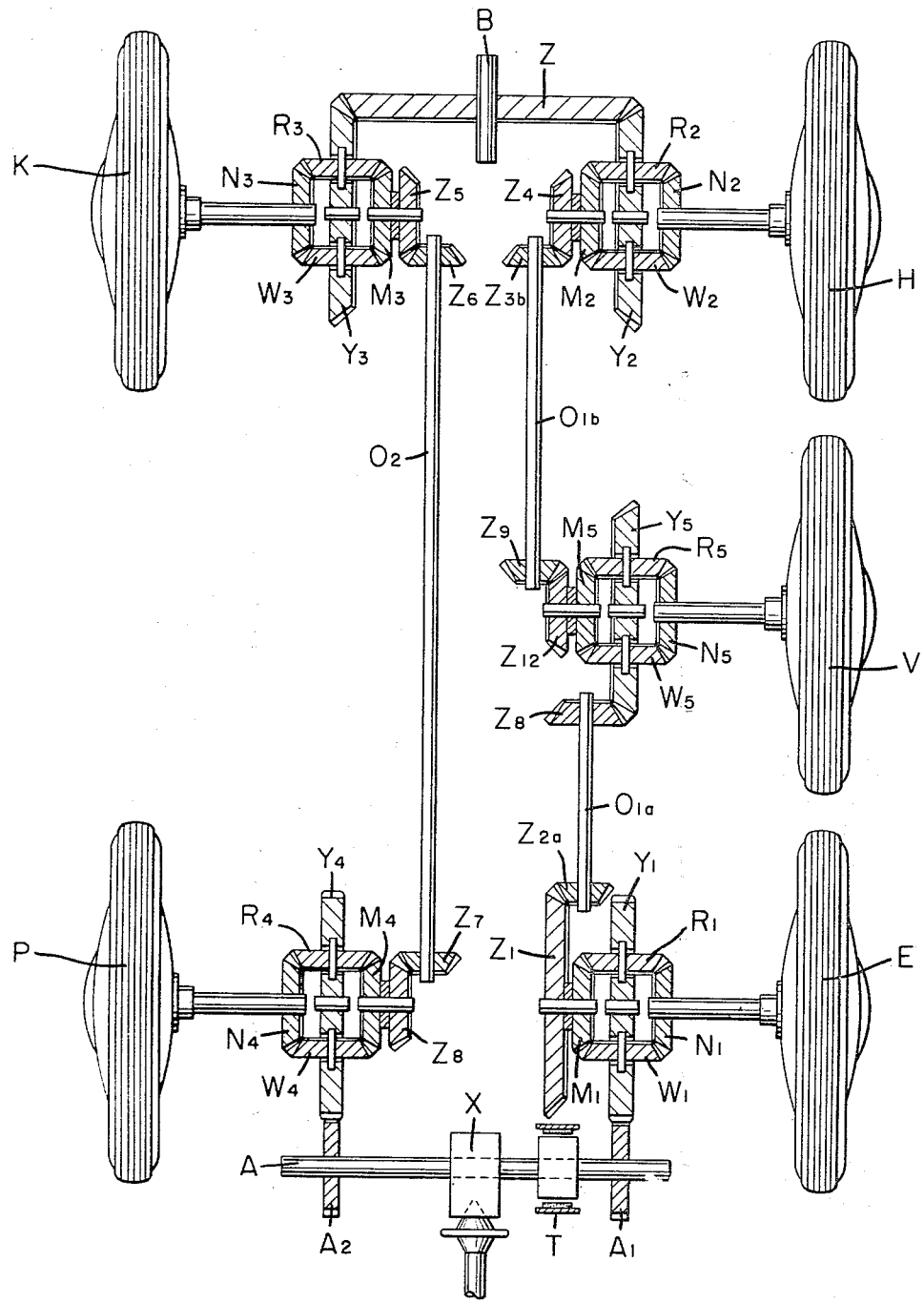
FIG. 3 is a plan view, partly in section, of a system according to the invention for a five-wheeled vehicle.
Figure 4:
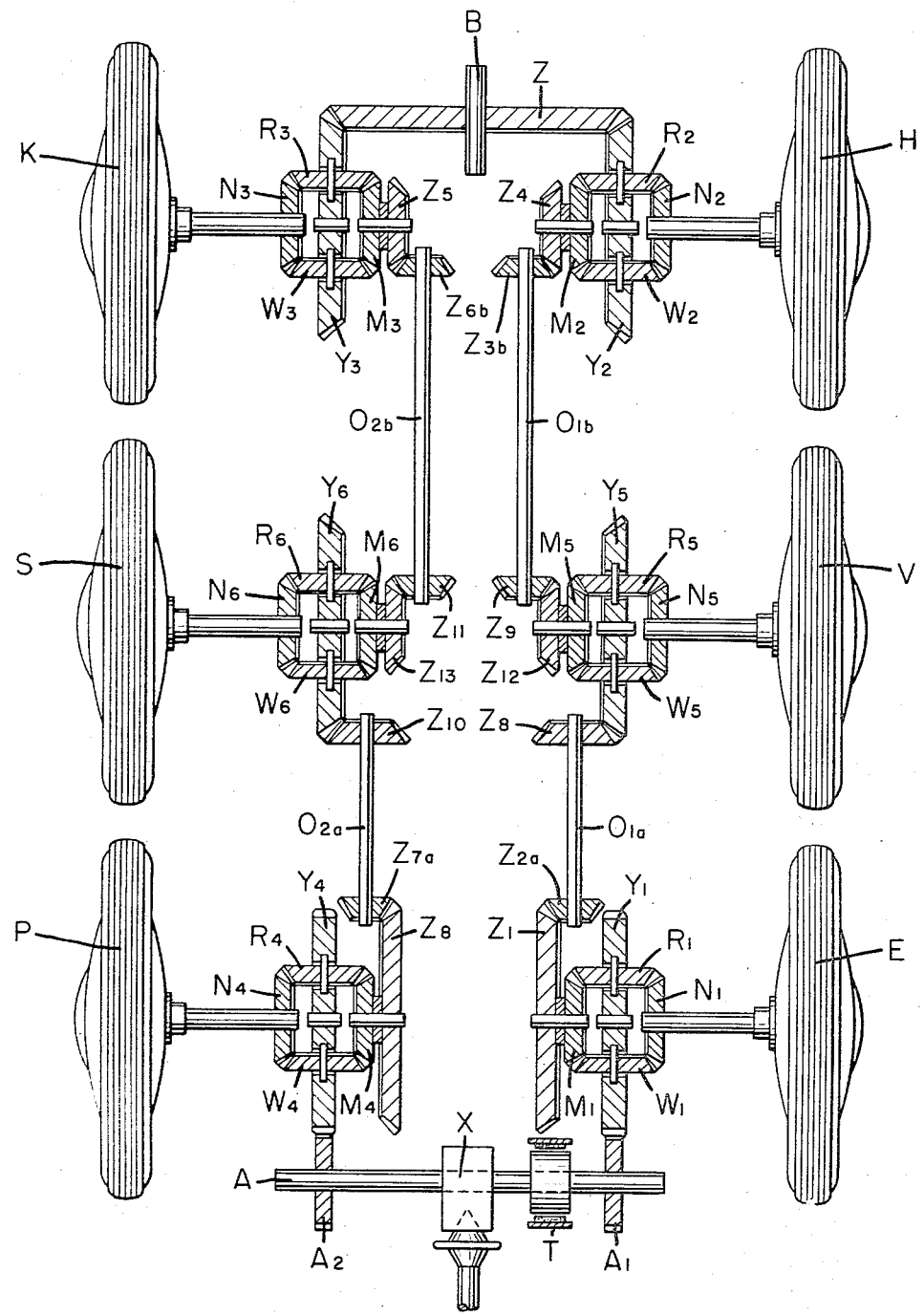
FIG. 4 is a plan view, partly in section, of a system according to the invention for a six-wheeled vehicle.

The gear A1 is meshed with one of the above mentioned three parts of a differential associated with a wheel E (FIGS. 1–5), of which differential one of its two other parts is mounted on the driving shaft of the wheel E while its other part is in interconnection with the bevel gear Z, mounted on the shaft B, either directly, in the case of a two-wheeled vehicle (FIG. 5), or through the interposition of one or more other differentials which are serially interconnected by means of rotary balances including a shaft O1 (FIGS. 1 and 2) or shafts O1a and O1b (FIGS. 3 and 4 variously mounting bevel gears Z2, Z3, Z2a, Z3b, Z8 and Z9, as shown, and each of which in turn is connected to a corresponding wheel H and V in the same manner as mentioned above for the preceding differential. This arrangement of the gear A1 and one differential or a plurality of serially connected differentials constitutes a first parallel system included in the entire system.

The gear A2 is meshed with one of the above mentioned three parts of a differential associated with a wheel P (FIGS. 1, 3, 4 and 5) or, in the case of a three-wheeled vehicle having two wheels on one side (FIG. 2), with a bevel gear Z7 mounted on one end a shaft O2 the other end of which shaft O2 mounts a bevel gear Z6 which is interconnected with one of the above mentioned three parts of a differential associated with a wheel K. The differential associated with wheel P is directly serially connected to a differential associated with a wheel K, by means of a rotary balance including a shaft O2 mounting bevel gears Z6 and Z7 (FIGS. 1 and 3) or is serially connected to a differential associated with a wheel S by means of a rotary balance including a shaft O2a mounting bevel gears Z7a and Z10 which latter differential is, in turn, serially connected to the differential associated with the wheel P by means of a rotary balance including a shaft O2b mounting bevel gears Z6b and Z11 (FIG. 4). This arrangement of gear A2 and one differential or a plurality of serially connected differentials constitutes a second parallel system included in the entire system.

It is to be noted that the gear Z mounting the shaft B acts as a rotary balance which interconnects the two parallel systems.

Each of the differentials comprises a crown Y mounting pinions or satellites R and W, a planetary gear M meshing simultaneously with the pinions R and W at the side of the crown Y facing away from the associated wheel, and a planetary gear N mounted on a shaft also carrying the associated wheel and simultaneously meshing with the pinions R and W at the side of the crown Y facing the associated wheel. The foregoing elements of the differentials associated with wheels E, H, K, P, V and S are designated respectively by the identifying numerals 1, 2, 3, 4, 5 and 6 (FIGS. 1–5).

Figure 5:
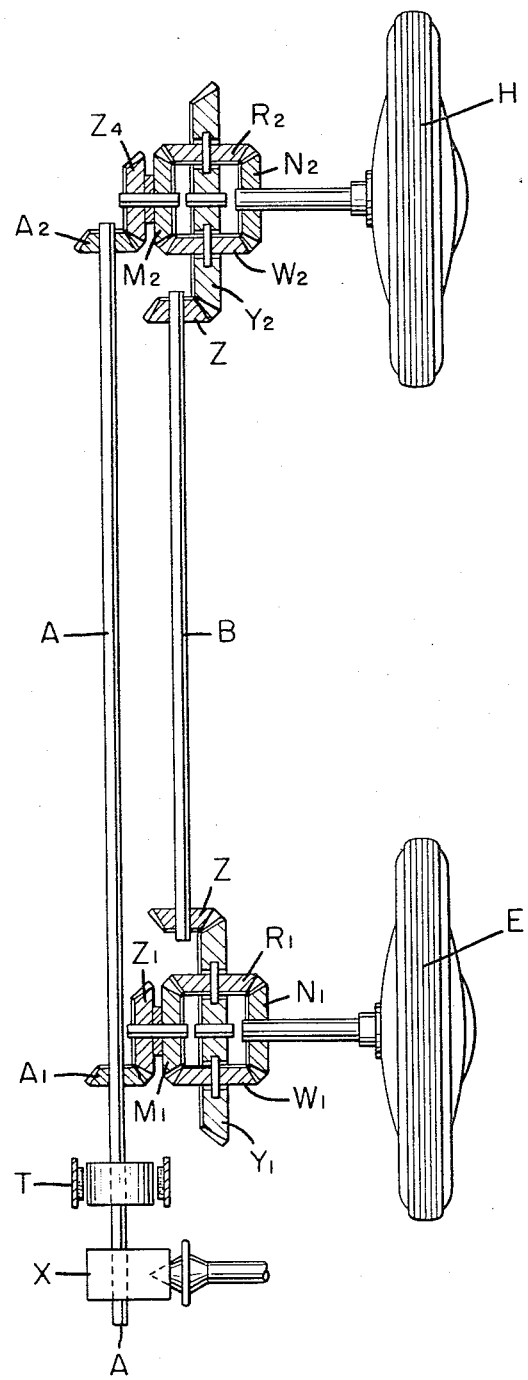
FIG. 5 is a plan view, partly in section, of a system according to the invention for a two-wheeled vehicle.

Mounted on a shaft with the planetary gears M1, M2, M3, M4, M5 ond M6 are, respectively, bevel gears Z1, Z4, Z5, Z8, Z12 and Z13 (FIGS. 1–5). The bevel gears Z1 and Z4 are interconnected by the shaft O1 having the bevel gears Z2 and Z3 mounted on its ends (FIGS. 1 and 2), or the bevel gears Z2 and Z3 mounted on its ends (FIGS. 3 and 4). On the other hand, in the case of a two-wheeled vehicle, the bevel gears Z1 and Z4 are interconnected by the main shaft A, the gears A1 and A2 mounted on the main shaft A meshing with the bevel gears Z1 and Z4, respectively (FIG. 5). The shaft O1a is complemented by the shaft O1b; the shaft O1b has bevel gears Z9 and Z3 mounted on its ends, which bevel gears respectively mesh with and thereby interconnect the bevel gears Z12 and Z4 (FIGS. 3 and 4).

Bevel gears Z5 and Z8 are interconnected by the shaft O2 having bevel gears Z6 and Z7 mounted on its ends (FIGS. 1 and 3), or the bevel gear Z5 is connected to the bevel gear Z13 by the shaft O2a having the bevel gears Z6b and Z11 mounted on its ends (FIG. 4). On the other hand, in the embodiment wherein only one wheel is at this side of the vehicle, the bevel gear Z5 is connected to the gear A2 by the shaft O2 having bevel gears Z6 and Z7 mounted on its ends (FIG. 2).

Thus, in the four-wheeled vehicle shown (FIG. 1) the wheels E and H are associated with one parallel system and the wheels K and P are associated with the other parallel system, in the three-wheeled vehicle shown (FIG. 2) the wheels E and H are associated with one parallel system and the wheel K is associated with the other parallel system, in the five-wheeled vehicle shown (FIG. 3) the wheels E, V and H are associated with one parallel system and the wheels K and P are associated with the other parallel system, in the six-wheeled vehicle shown (FIG. 4) the wheels E, V and H are associated with one parallel system and the wheels K, S and P are associated with the other parallel system, and in the two-wheeled vehicle shown the wheel E is associated with one parallel system and the wheel H is associated with the other parallel system (FIG. 5).

Due to the special juxtaposition of elements in the two-wheeled vehicle, two bevel gears Z, rather than a single bevel gear Z, are provided for interconnecting the two parallel systems (FIG. 5).

In addition to the rotary balance interconnecting the two parallel systems and constituted of the bevel gear or gears Z in combination with the shaft B the following combination of elements each constitute a rotary balance within one or the other of the parallel systems: Z1–Z2–O1–Z3–Z4 (FIGS. 1 and 2); Z5–Z6–O2–Z7–Z8 (FIGS. 1 and 3); Z1–Z2a–O1a–Z8 (FIGS. 3 and 4); Z12–Z9–O1b–Z3b–Z4 (FIGS. 3 and 4); Z5–Z6b–O2b–Z11–Z13 (FIG. 4); and Z10–O2a–Z7a–Z8 (FIG. 4).

When the vehicle is advancing normally, the rotary balance interconnecting the two parallel systems is equilibrated and, therefore, is stationary and the other rotary balances are not equilibrated and, therefore, are rotating.

The automatic self-compensating action of the systems of the invention will now be described with reference to a four-wheeled vehicle (FIG. 1) as this type of vehicle is most common; however, it will readily be appreciated that the same principles apply to systems of the invention applied to vehicles having two (FIG. 5), three (FIG. 2), five (FIG. 3), six (FIG. 4) or any plural number of wheels ad infinitum.

*With respect to driving*

If the vehicle advances normally, i.e., does not tend to veer or skid, all four wheels E, H, K and P rotate equally; consequently, two forces acting on the bevel gear Z, which forces are transmitted to the bevel gear Z by the two crowns Y2 and Y3, are equal and in an opposed sense one to another, and, accordingly, the bevel gear Z is in equilibrium and does not rotate. In this case, each of the two other rotary balances Z1–Z2–O1–Z3–Z4 and Z5–Z6–O2–Z7–Z8 are non equilibrated and are rotating equally in opposite sense to each other.

However, if a wheel of the vehicle frictionally engages the ground to a lesser or greater degree than the other wheels, then one of the two forces acting on the bevel gear Z is greater than the other, and the bevel gear Z is not equilibrated and rotates clockwise or counterclockwise depending on which of these two forces is greater. In this case the rates of rotation of the two rotary balances Z1–Z2–O1–Z3–Z4 and Z5–Z6–O2–Z7–Z8 and the two crowns Y2 and Y3 will duly change in an opposite sense and this has the result of relatively increasing and decreasing the rate of revolution of each one of the wheels K, H, P, E, the increasing and decreasing being inversely proportional to the effective weight on and friction with the ground of each wheel. Thus, for example, if the three wheels of a four-wheeled vehicle remain idle for any reason, the other wheel will rotate at four times the rate at which each of the four wheels would have rotated if all were equally rotating.

*With respect to braking*

Braking is automatically self-compensated at every instant depending on the friction of the ground with each of the wheels and the weight on each of the wheels. This self-compensation is instantaneously and automatically effected as soon as braking is applied to the main shaft A through brakes T and continues even when the shaft A is brought to a standstill by full braking.

If the friction of the ground with each wheel and the weight on each wheel is equal for all the vehicle's wheels, the vehicle will immediately stop; but, in the event that one wheel does not come into firm frictional engagement with the ground, all the remaining wheels of the vehicle will remain unbraked and, consequently, the vehicle will continue to advance a little and, therefore, the three wheels that are in firm frictional engagement with the ground will roll forward while, on the contrary, the wheel which is not in firm frictional engagement with the ground will turn backwatrds at three times the forward rate of rotation of the other three wheels because the revolutions of the other three wheels are added to this wheel but in reverse sense.

In other words, in abrupt braking, supposing that one of the wheels is not firmly in frictional engagement with the ground, the vehicle will advance a little and consequently the three other wheels, which are in firm frictional engagement with the ground, will turn a little forward while the aforesaid wheel will turn backward at triple speed, this last wheel tending to pull the vehicle backwards and thereby compensating for its imperfect frictional engagement with the ground. This appears to be a defect, but, in reality, it is an advantage, because the vehicle does not side skid or overturn, owing to the existence of the self-compensating braking. Thus, a vehicle not including the system of the present invention would tend to be overthrown, and, aside from any damage thereby resulting, it would thereby advance by at least its length, i.e. much more than it would advance with the system of the present invention.

A similar situation arises when three wheels are inadequately frictionally engaged with the ground. According to the invention, the vehicle neither side skids nor does it overturn when the brake is applied on the main shaft A, no matter what the state of the ground may be.

It is to be noted that the conventional hand-lever generally used for braking of all the wheels of the vehicle remains as it is and acts independently of the system of the invention.

In addition, it is possible to make only a partial use of the system of the invention, i.e., either only for braking or only for driving the vehicle.

The invention is not to be construed as limited to the particular forms disclosed herein, since these are to be regarded as illustrative rather than restrictive.

What I claim and desire to secure by Letters Patent is:

1. An arrangement for automatically changing the relative speeds of the wheels of a two-wheeled vehicle to compensate for the frictionally engaging of one of the wheels with the ground to a degree different from the degree of frictionally engaging with the ground of the other of the wheels, said arrangement comprising two parallel power train systems, each power train system including a differential associated with a respective one of the wheels, the differential of each of said systems having an input, a first output for driving the wheel associated with the differential and a second output, said second outputs being serially connected whereby the series connection of said second outputs constitutes balance means interconnecting said second outputs, said balance means comprising a single rotary means rotating about a fixed axis and including means engaging said second outputs, whereby when one of the wheels frictionally engages the ground to a degree different from the degree to which the other of the wheels frictionally engages the ground, the respective second outputs of the respective differentials differ in magnitude and thereby unbalance the balance means and cause the balance means to transmit from the differential having the greater second output to the differential having the lesser second output the difference between the outputs.

2. A system according to claim 1, in which the respective inputs to the respective differentials are from a common rotatable drive shaft operatively connected to an engine for driving the vehicle.

3. A system according to claim 1, in which braking means is mounted on said common shaft and said braking means is adapted to be engaged to stop rotation of the drive shaft and thereby brake the vehicle.

4. An arrangement for automatically changing the relative speeds of the wheels of a vehicle having more than two wheels to compensate for the frictionally engaging of a wheel of the vehicle with the ground to a degree different from the degree to which another of the wheels of the vehicle frictionally engages the ground, said arrangement comprising two parallel power train systems, each power train system including a number of differentials corresponding to the number of the wheels in said system, each of said systems including an input, a first differential having an input, a first output from said first differential for driving the corresponding one of said wheels, a second output from said first differential, at least one of said parallel systems including at least another said differential, each said other differential being connected in series with said second output of said first differential in said one system, said other differential including a first output for driving the corresponding wheel and a second output for each of said other differentials which comprises in part said series connection, whereby said second output of said serially connected differentials constitute the input of the immediately succeeding serially connected differential, and balance means interconnecting the respective second outputs of the last one of the differentials of each of the parallel systems, whereby when one of the wheels frictionally engages the ground to a degree different from the degree to which another of the wheels frictionally engages the ground, the respective second outputs of the respective last differentials differ in magnitude and thereby unbalance the balance means and cause the balance means to transmit from the last differential having the greater second output to the last differential having the lesser second output the difference between said greater and lesser second outputs.

5. A system according to claim 4, in which the respective inputs to the respective first differentials are from a common rotatable drive shaft operatively connected to an engine for driving the vehicle.

6. A system according to claim 4, in which braking means is mounted on said common shaft and said braking means is adapted to be engaged to stop rotation of the drive shaft and thereby brake the vehicle.

References Cited
UNITED STATES PATENTS 1,207,058  12/1916  Leedy _____ 74–665

A. HARRY LEVY, *Primary Examiner.*